(12) United States Patent
Takatsu et al.

(10) Patent No.: US 12,064,954 B2
(45) Date of Patent: Aug. 20, 2024

(54) 3-D INKJET PRINTING METHOD WITH LAYER WARPAGE CONTROL AND INK SET

(71) Applicant: MIMAKI ENGINEERING CO., LTD., Nagano (JP)

(72) Inventors: Akira Takatsu, Nagano (JP); Shun Horiuchi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 17/637,078

(22) PCT Filed: Aug. 24, 2020

(86) PCT No.: PCT/JP2020/031797
§ 371 (c)(1),
(2) Date: Feb. 22, 2022

(87) PCT Pub. No.: WO2021/049279
PCT Pub. Date: Mar. 18, 2021

(65) Prior Publication Data
US 2022/0281239 A1 Sep. 8, 2022

(30) Foreign Application Priority Data
Sep. 13, 2019 (JP) .................................. 2019-167675

(51) Int. Cl.
*B41J 11/00* (2006.01)
*B41J 2/21* (2006.01)

(52) U.S. Cl.
CPC ........ *B41J 11/00212* (2021.01); *B41J 2/2114* (2013.01); *B41J 11/00214* (2021.01); *B41J 11/00218* (2021.01)

(58) Field of Classification Search
CPC .......... B29C 64/112; B29C 2035/0827; B33Y 10/00; B33Y 30/00; B33Y 50/02;
(Continued)

(56) References Cited

U.S. PATENT DOCUMENTS

| | | | | |
|---|---|---|---|---|
| 4,871,408 | A | * | 10/1989 | Honma ................ G03G 7/0073 428/209 |
| 5,122,430 | A | * | 6/1992 | Nishitsuji .............. G03G 9/097 430/108.6 |

(Continued)

FOREIGN PATENT DOCUMENTS

| | | |
|---|---|---|
| EP | 2946934 | 11/2015 |
| EP | 3132920 | 2/2017 |
| JP | 2018065308 | 4/2018 |

OTHER PUBLICATIONS

"International Search Report (Form PCT/ISA/210) of PCT/JP2020/031797", mailed on Nov. 10, 2020, with English translation thereof, pp. 1-6.

(Continued)

*Primary Examiner* — John Zimmermann
(74) *Attorney, Agent, or Firm* — JCIPRNET

(57) ABSTRACT

Provided are an inkjet printing method and an ink set, in which forward and reverse warp inks are printed in an arrangement that reduces warp. The forward warp ink is the ink in which a warp when cured and shrunk by irradiation of light is a forward warp in which a portion on a side where light is irradiated by a light irradiation device is large in the degree of curing and shrinkage as compared with a portion on an opposite side. The reverse warp ink is the ink in which a warp when cured and shrunk by irradiation of light is a reverse warp in which a portion on a side opposite to a side where light is irradiated by the light irradiation device is large in the degree of curing and shrinkage as compared with a portion on the side where light is irradiated.

5 Claims, 11 Drawing Sheets

(58) Field of Classification Search
CPC . B33Y 70/00; B41J 11/00214; B41J 11/0021;
B41M 3/16; B41M 3/00; B41M 5/28;
B32B 3/30; B32B 38/06
See application file for complete search history.

(56) References Cited

U.S. PATENT DOCUMENTS

| | | | | |
|---|---|---|---|---|
| 10,414,076 | B2* | 9/2019 | Horiuchi | B29C 44/022 |
| 10,535,128 | B2* | 1/2020 | Fukushima | G06T 7/0002 |
| 11,673,364 | B2* | 6/2023 | Macor | B05D 3/067 |
| | | | | 427/256 |
| 2012/0218338 | A1* | 8/2012 | Kanamura | B41J 2/205 |
| | | | | 347/15 |
| 2012/0282448 | A1* | 11/2012 | Chretien | C09D 11/34 |
| | | | | 264/401 |
| 2016/0059482 | A1* | 3/2016 | Hakkaku | B29C 64/112 |
| | | | | 264/401 |
| 2016/0193858 | A1* | 7/2016 | Tsuchiya | B41J 11/00212 |
| | | | | 347/16 |
| 2018/0170086 | A1* | 6/2018 | Fukushima | B29C 64/268 |
| 2019/0009455 | A1* | 1/2019 | Biskop | B29C 64/112 |
| 2019/0009456 | A1* | 1/2019 | Biskop | B33Y 30/00 |
| 2019/0184716 | A1* | 6/2019 | Totsuka | B29C 64/112 |
| 2020/0122484 | A1* | 4/2020 | Campbell | B29C 64/209 |

OTHER PUBLICATIONS

"Search Report of Europe Counterpart Application", issued on Oct. 13, 2022, p. 1-p. 10.

\* cited by examiner (a)

(b)

| | | | | |
|---|---|---|---|---|
| Inkjet head 31 | 80 | 60 | 80 | 80 | 100 |
| Inkjet head 32 | 120 | 180 | 160 | 140 | 100 |
| Nozzle row 33a | 100 | 100 | 100 | 100 | 100 |
| Nozzle row 33b | 100 | 100 | 100 | 100 | 100 |

←Reverse warp   Forward warp→

FIG. 7

3-D INKJET PRINTING METHOD WITH LAYER WARPAGE CONTROL AND INK SET

CROSS-REFERENCE TO RELATED APPLICATION

This application is a 371 application of the International PCT application serial no. PCT/JP2020/031797, filed on Aug. 24, 2020, which claims the priority benefits of Japan Patent Application No. 2019-167675, filed on Sep. 13, 2019. The entirety of each of the above-mentioned patent applications is hereby incorporated by reference herein and made a part of this specification.

TECHNICAL FIELD

The present invention relates to an inkjet printing method and an ink set that execute printing with ejected ink.

BACKGROUND ART

As a conventional inkjet printing method, that which makes warp of a shaped object being shaped less likely to occur by setting the amount of irradiation to some positions different from the amount of irradiation to other positions for the amount of irradiation of ultraviolet rays with respect to a layer of ultraviolet curable ink is known (see Patent Literature 1).

CITATION LIST

Patent Literature

Patent Literature 1: Japanese Unexamined Patent Publication No. 2018-065308

SUMMARY OF INVENTION

Technical Problems

The present invention provides an inkjet printing method and an ink set capable of suppressing warp of a printed matter through a method different from the conventional method.

Solutions to Problems

An inkjet printing method of the present invention relates to an inkjet printing method that uses an inkjet printer including an inkjet head that ejects ink, which cures and shrinks when irradiated with light; and a light irradiation device that irradiates light toward the ink; where a forward warp ink and a reverse warp ink are printed in an arrangement that reduces warp of each other, the forward warp ink serving as the ink where a warp when cured and shrunk by irradiation of light is a forward warp in which a portion on a side where the light is irradiated by the light irradiation device is large in the degree of curing and shrinkage as compared with a portion on a side opposite to the side where the light is irradiated by the light irradiation device, and the reverse warp ink serving as the ink where a warp when cured and shrunk by irradiation of light is a reverse warp in which a portion on a side opposite to a side where the light is irradiated by the light irradiation device is large in the degree of curing and shrinkage as compared with a portion on the side where the light is irradiated by the light irradiation device.

With this configuration, the inkjet printing method of the present invention can suppress the warp of the printed matter since the forward warp ink and the reverse warp ink are printed in an arrangement that reduces the warp of each other.

In the inkjet printing method of the present invention, when printing is performed so that a plurality of droplets of the ink ejected by the inkjet head and landed on a medium are connected, printing may be performed by mixing the droplets of the forward warp ink and the droplets of the reverse warp ink.

With this configuration, in the inkjet printing method of the present invention, when printing is performed so that a plurality of droplets of ink ejected by an inkjet head and landed on a medium are connected, printing is performed by mixing the forward warp ink droplets and the reverse warp ink droplets, and thus the warp of the printed matter formed by printing on a thin medium, for example, can be suppressed.

In the inkjet printing method of the present invention, when printing is performed by stacking the layers of ink to form a three-dimensional shaped object by the plurality of layers, printing may be performed so that a shaped object includes the layer formed by the forward warp ink and the layer formed by the reverse warp ink.

With this configuration, in the inkjet printing method of the present invention, when printing is performed by stacking the layers of ink to form a three-dimensional shaped object by the plurality of layers, printing is performed so that the shaped object includes the layer formed by the forward warp ink and the layer formed by the reverse warp ink, and thus the warp of the printed matter, which is a three-dimensional shaped object, can be suppressed.

In the inkjet printing method of the present invention, when printing is performed by staking the layers of ink to form a three-dimensional shaped object by the plurality of layers, printing may be performed so that a shaped object includes the layer formed by mixing the forward warp ink and the reverse warp ink.

With this configuration, in the inkjet printing method of the present invention, when printing is performed by stacking the layers of ink form a three-dimensional shaped object by the plurality of layers, printing is performed so that the shaped object includes the layer formed by mixing the forward warp ink and the reverse warp ink, and thus the warp of the printed matter, which is a three-dimensional shaped object, can be suppressed.

An ink set of the present invention relates to an ink set used by an inkjet printer including an inkjet head that ejects ink, which cures and shrinks when irradiated with light, and a light irradiation device that irradiates light toward the ink, the ink set including a forward warp ink serving as the ink where a warp when cured and shrunk by irradiation of light is a forward warp in which a portion on a side where the light is irradiated by the light irradiation device is large in the degree of curing and shrinkage as compared with a portion on a side opposite to the side where the light is irradiated by the light irradiation device; and a reverse warp ink serving as the ink where a warp when cured and shrunk by irradiation of light is a reverse warp in which a portion on a side opposite to a side where the light is irradiated by the light irradiation device is large in the degree of curing and shrinkage as compared with a portion on the side where the light is irradiated by the light irradiation device.

With this configuration, the ink set of the present invention can suppress the warp of the printed matter by having the forward warp ink and the reverse warp ink printed by the inkjet printer in an arrangement to reduce the warp of each other.

Effect of the Invention

The inkjet printing method and the ink set of the present invention can suppress warp of a printed matter through a method different from the conventional method.

Figure 1:
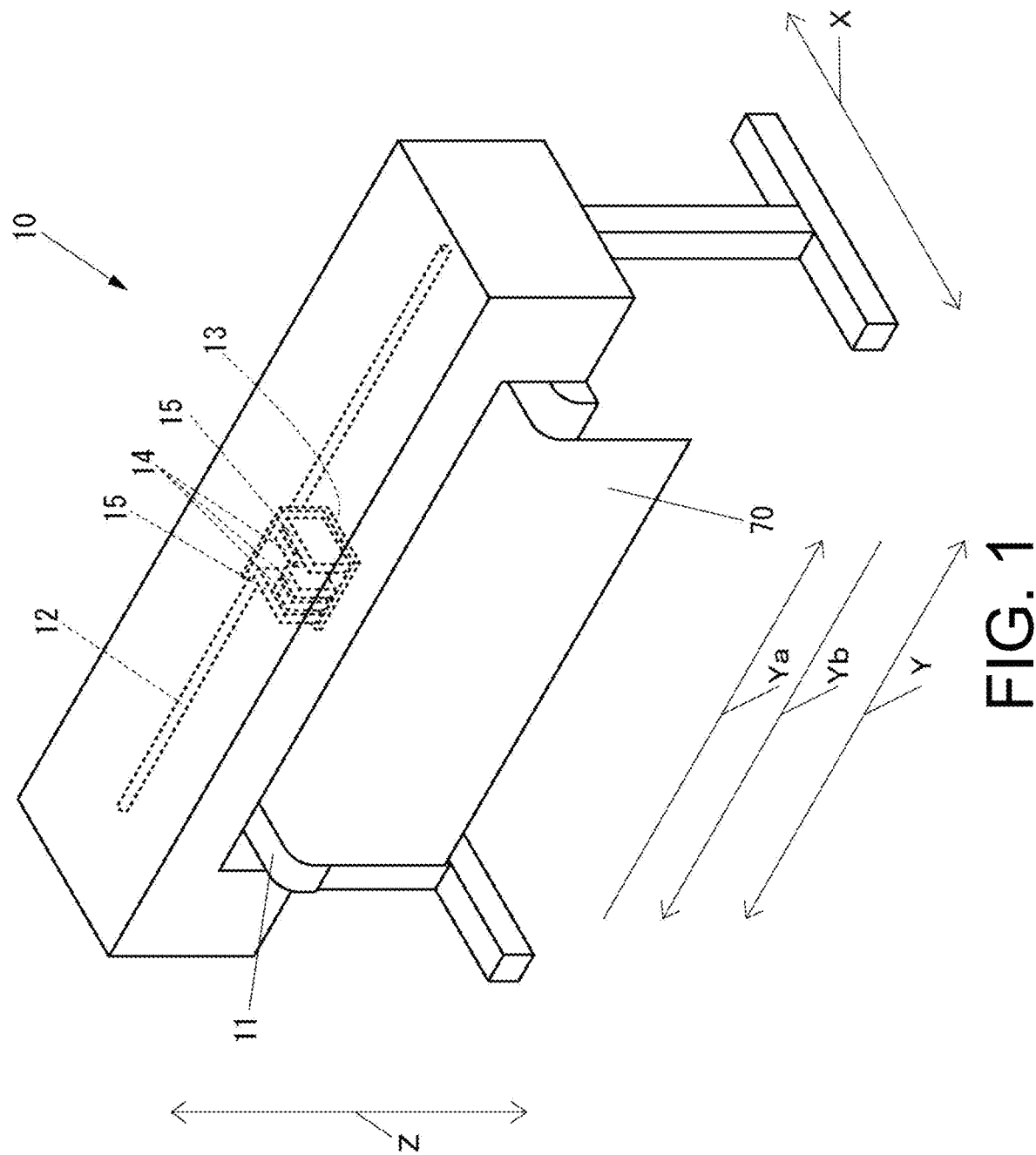
FIG. 1 is a perspective view of an outer appearance of an inkjet printer according to one embodiment of the present invention.
Figure 4:
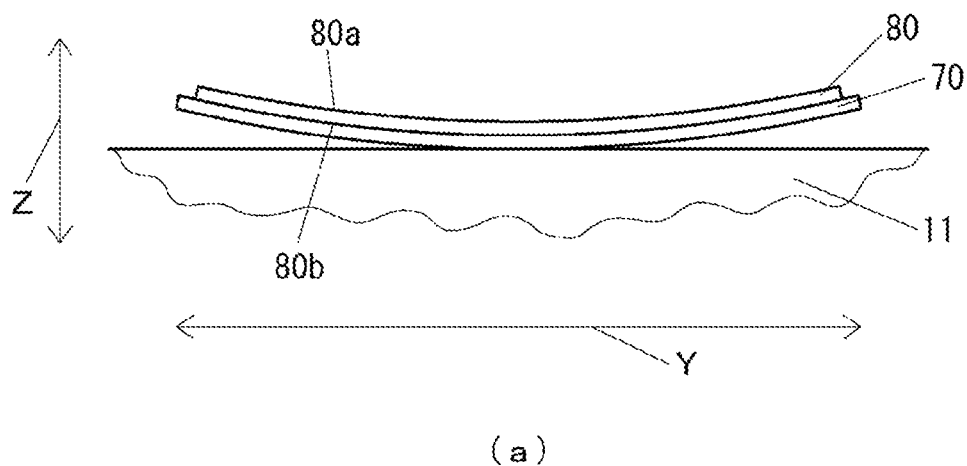
Figure 4:
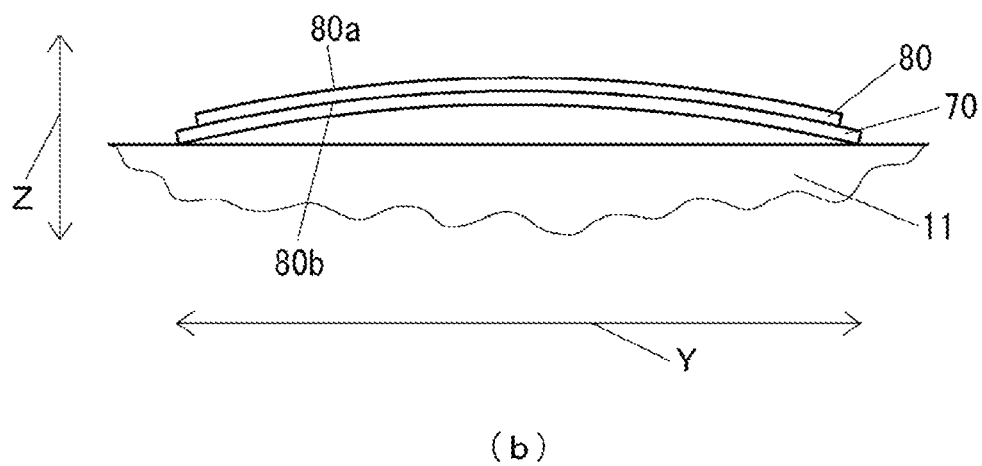

(a) of FIG. 4 is a front view of a part of the inkjet printer shown in FIG. 1 when the ink is forward warped. (b) of FIG. 4 is a front view of a part of the inkjet printer shown in FIG. 1 when the ink is reverse warped.

Figure 5:
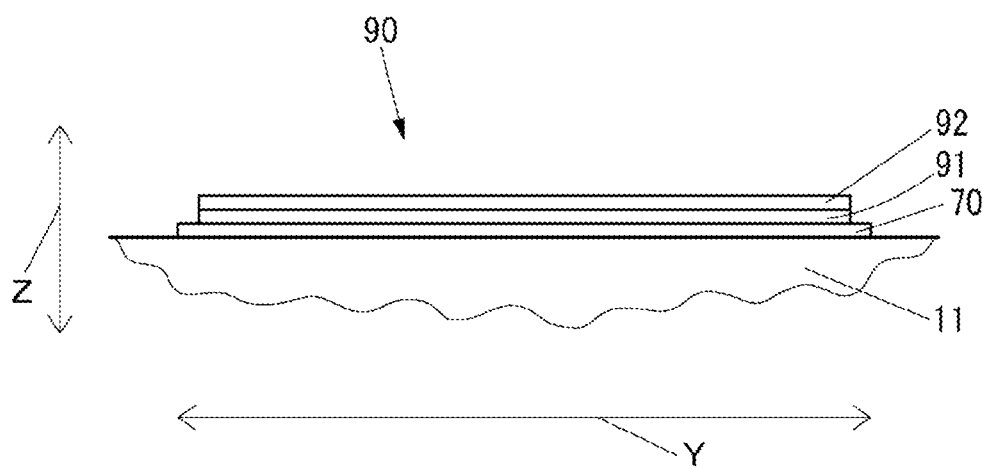

FIG. 5 is a side view of a printed matter printed through experiment by the inkjet printer shown in FIG. 1.

Figure 6:
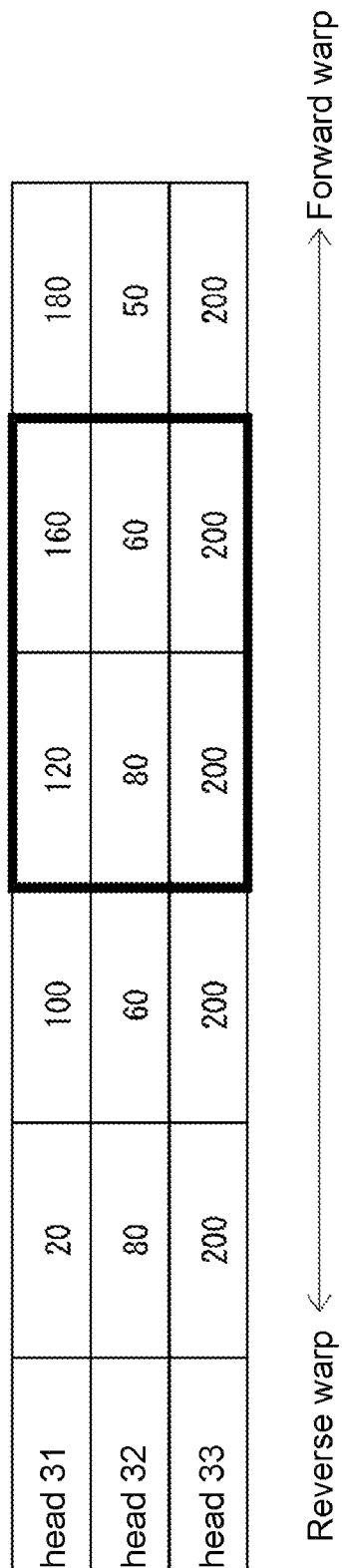

FIG. 6 is a diagram showing the first experimental result by the inkjet printer shown in FIG. 1.

FIG. 7 is a diagram showing the second experimental result by the inkjet printer shown in FIG. 1.

Figure 8:
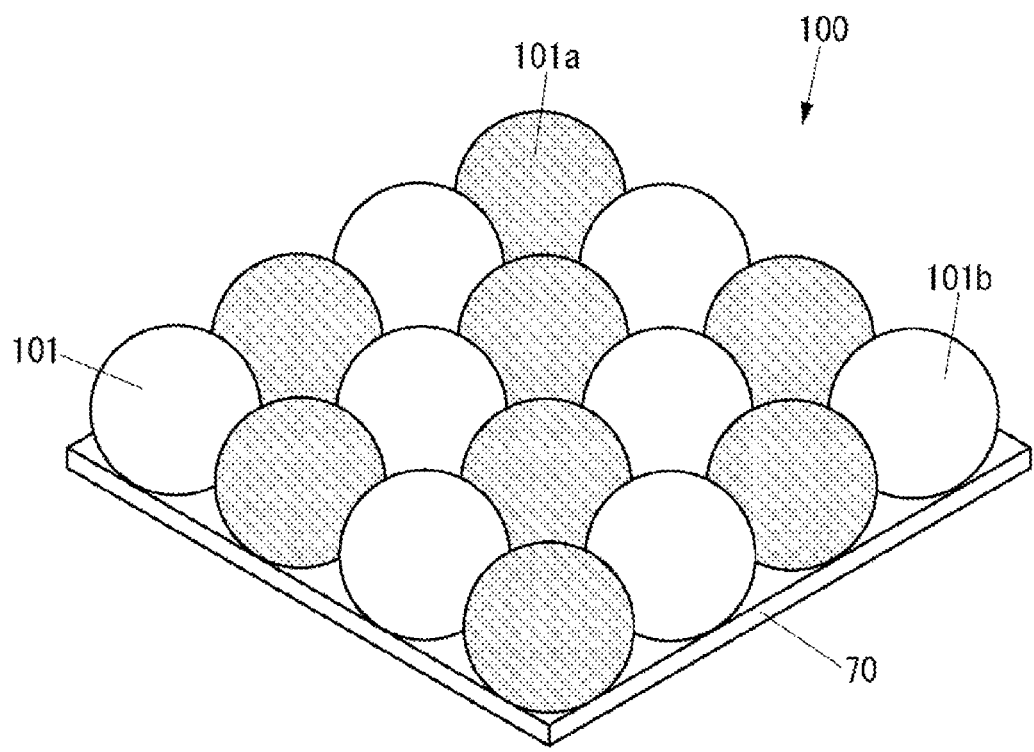

FIG. 8 is a perspective view of a part of a printed matter printed by the inkjet printer shown in FIG. 1.

Figure 9:
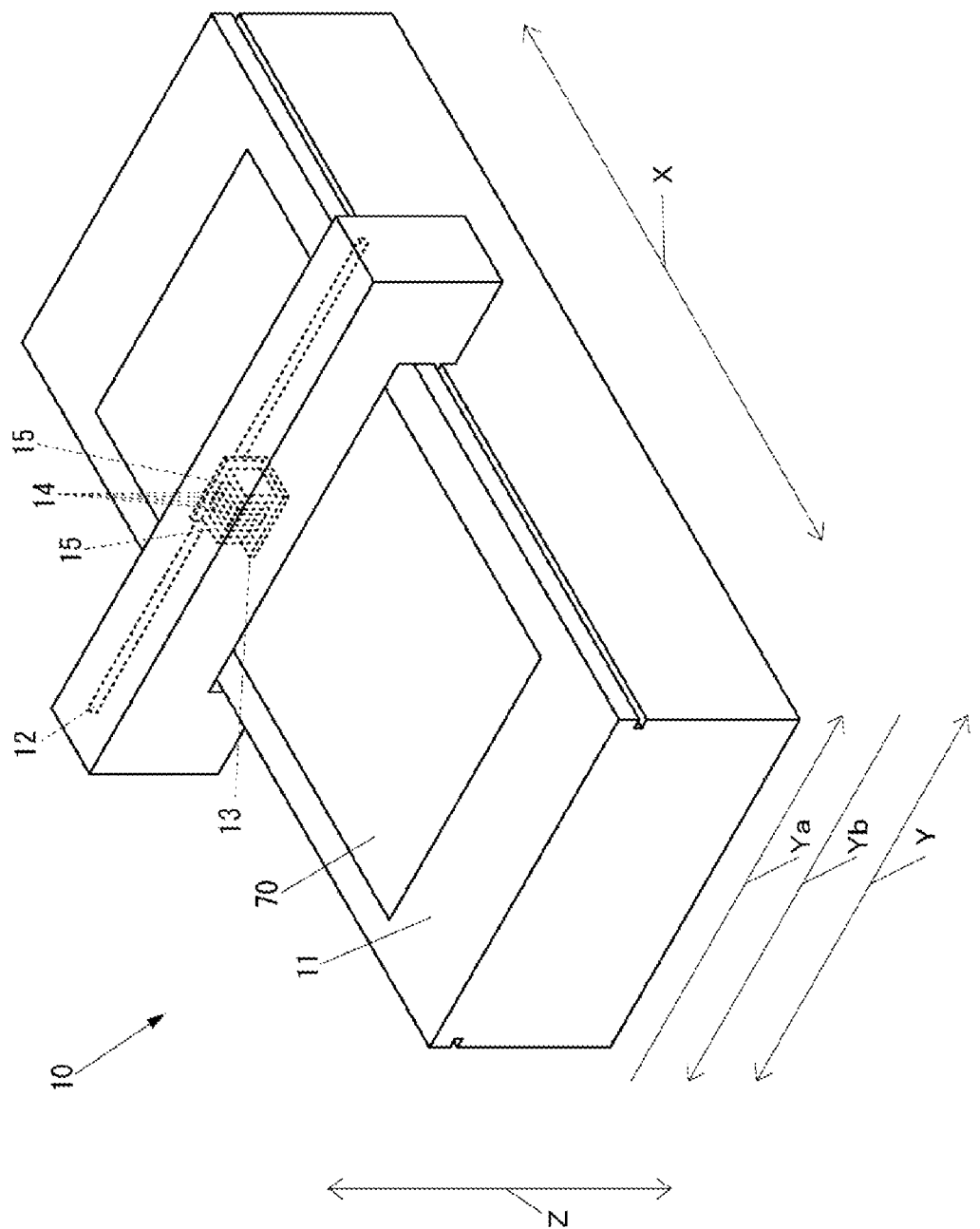

FIG. 9 is a perspective view of an outer appearance of an inkjet printer according to one embodiment of the present invention.

Figure 10:
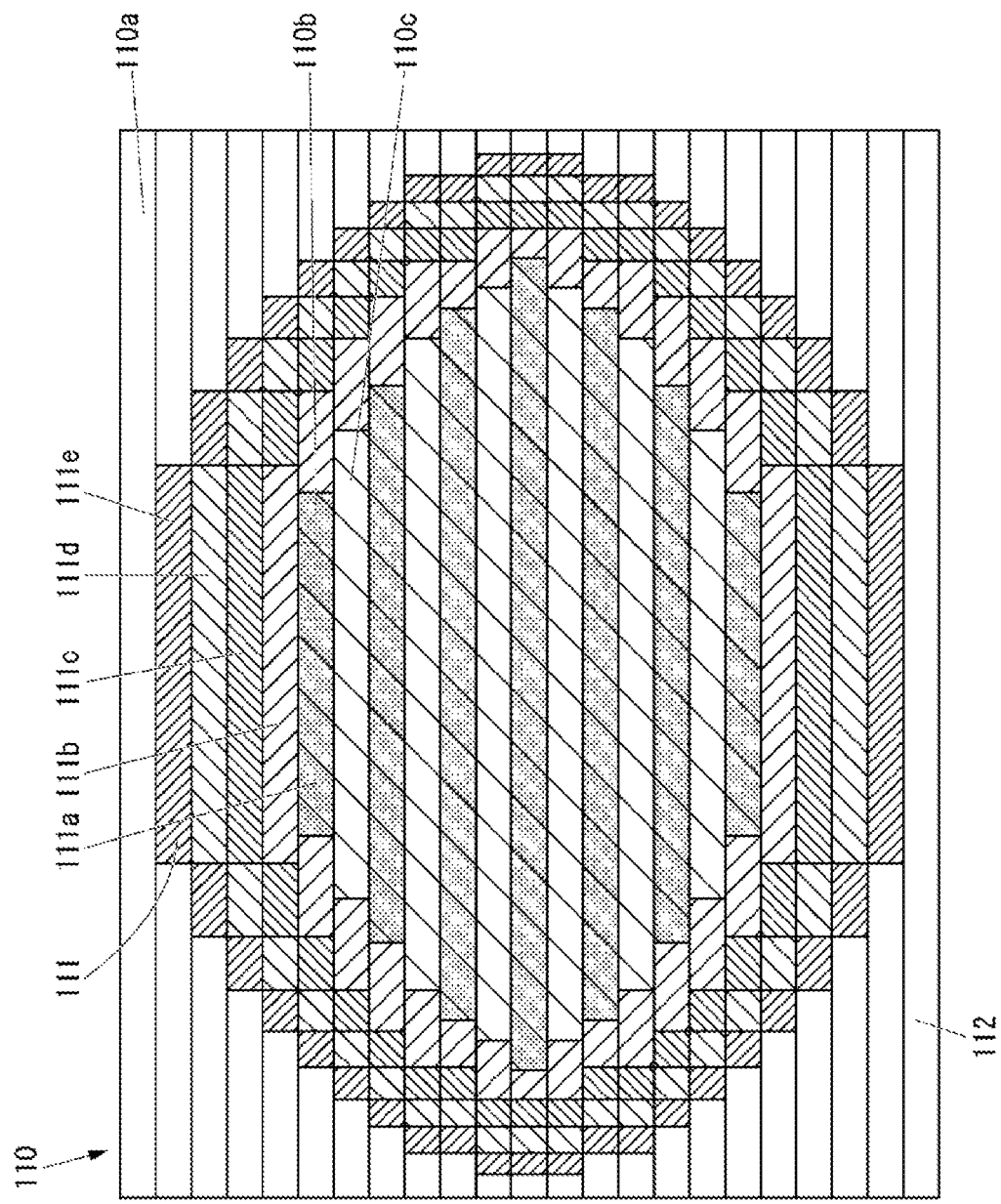

FIG. 10 is a side sectional view of a three-dimensional printed matter printed by an inkjet printer for 3D printing, which is different from the inkjet printer shown in FIG. 1.

Figure 11:
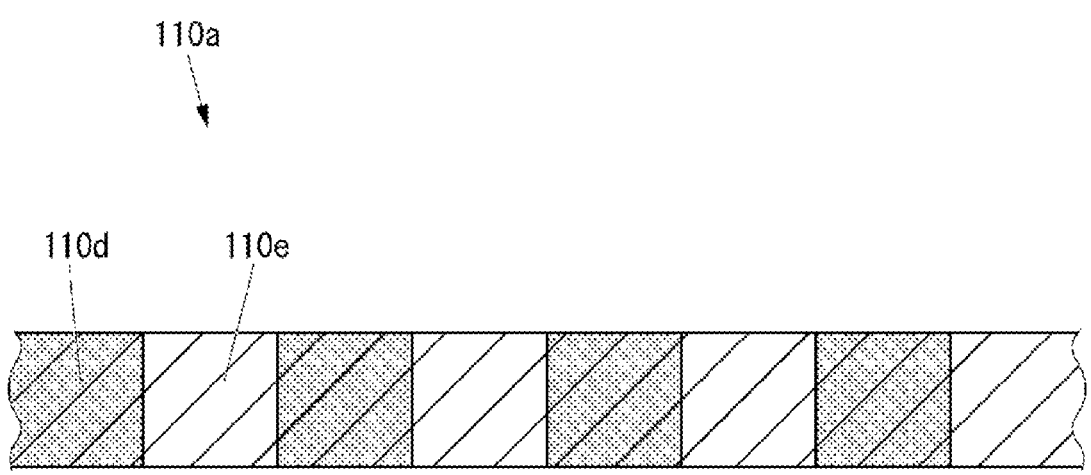

FIG. 11 is a diagram showing an example of the ink layer constituting a shaping region shown in FIG. 10 different from the example shown in FIG. 10.

DESCRIPTION OF EMBODIMENT

Hereinafter, one embodiment of the present invention will be described with reference to the drawings.

First, the configuration of an inkjet printer according to the present embodiment will be described.

FIG. 1 is a perspective view of an outer appearance of an inkjet printer 10 according to the present embodiment.

As shown in FIG. 1, the inkjet printer 10 includes a platen 11 that supports a medium 70 from the lower side in a vertical direction indicated by an arrow Z, a guide rail 12 disposed on an upper side in the vertical direction with respect to the platen 11 and extended in a left-right direction (hereinafter referred to as "main scanning direction") indicated by an arrow Y orthogonal to the vertical direction, a carriage 13 which movement in the main scanning direction is guided by the guide rail 12, a plurality of inkjet heads 14 that eject ink toward the medium 70 supported by the platen 11, and a plurality of light irradiation devices 15 for irradiating light toward the ink attached to the medium 70 supported by the platen 11.

The carriage 13 is guided by the guide rail 12 and moved by a carriage scanning device 17 (see FIG. 2) described later in one direction (hereinafter referred to as "outward direction") indicated by an arrow Ya of the main scanning direction and the other direction (hereinafter referred to as "return direction") indicated by an arrow Yb of the main scanning direction.

The inkjet head 14 and the light irradiation device 15 are mounted on the carriage 13.

The ink ejected by the inkjet head 14 is an ink that cures by being irradiated with light by the light irradiation device 15, and is, for example, a UV ink that cures by being irradiated with ultraviolet light. Various inks can be adopted as the ink ejected by the inkjet head 14. For example, cyan ink, magenta ink, yellow ink, black ink, light cyan ink, light magenta ink, light yellow ink, light black ink, white ink, clear ink, and silver ink can be adopted as the ink ejected by the inkjet head 14.

The light irradiation device 15 is, for example, a device that irradiates ultraviolet light with an LED (Light Emitting Diode).

An arbitrary medium, for example, a thin medium such as paper or film can be adopted as the medium 70.

Figure 2:
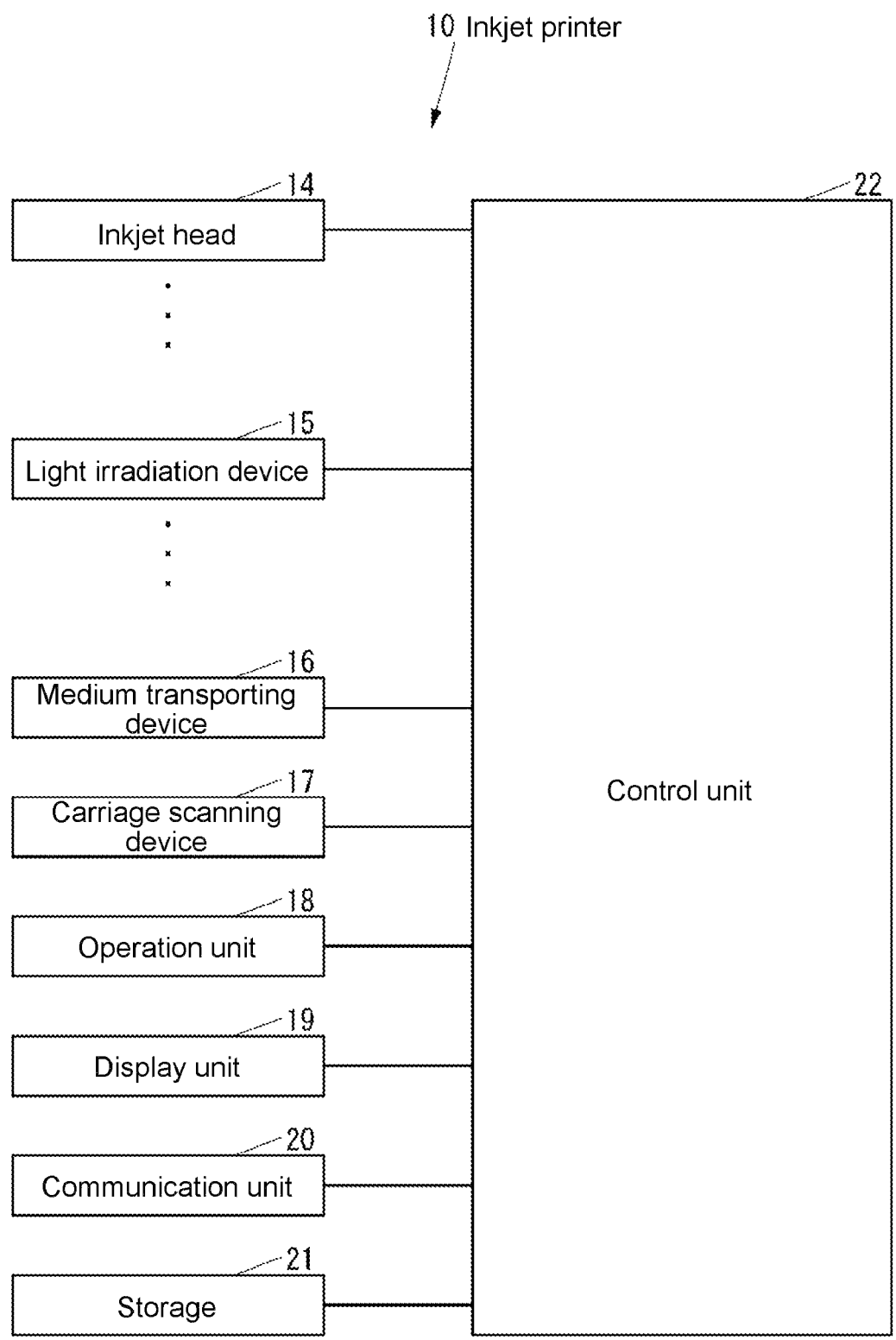
FIG. 2 is a block diagram of the inkjet printer shown in FIG. 1.

FIG. 2 is a block diagram of the inkjet printer 10.

As shown in FIG. 2, the inkjet printer 10 includes a plurality of inkjet heads 14, a plurality of light irradiation devices 15, a medium transporting device 16 that transports the medium 70 (see FIG. 1) in a front-back direction (hereinafter referred to as "sub scanning direction") indicated by an arrow X (see FIG. 1) orthogonal to both the vertical direction and the main scanning direction, a carriage scanning device 17 that moves the carriage 13 (see FIG. 1) with respect to the platen 11 (see FIG. 1) in the main scanning direction along the guide rail 12 (see FIG. 1), an operation unit 18 which is an input device such as a button, for example, to which various operations are input, a display unit 19 which is a display device such as a liquid crystal display (LCD) that displays various information, a communication unit 20 which is a communication device that communicates with an external device directly in a wired or wireless manner through a network or without the network, a storage 21 which is a nonvolatile storage device such as a semiconductor memory and hard disk drive (HDD) that stores various information, and a control unit 22 that controls the entire inkjet printer 10.

The control unit 22 includes, for example, a central processing unit (CPU), a read only memory (ROM) that stores programs and various data, and a random access memory (RAM) used as a work area of the CPU. The CPU executes the program stored in the ROM or the storage 21.

Figure 3:
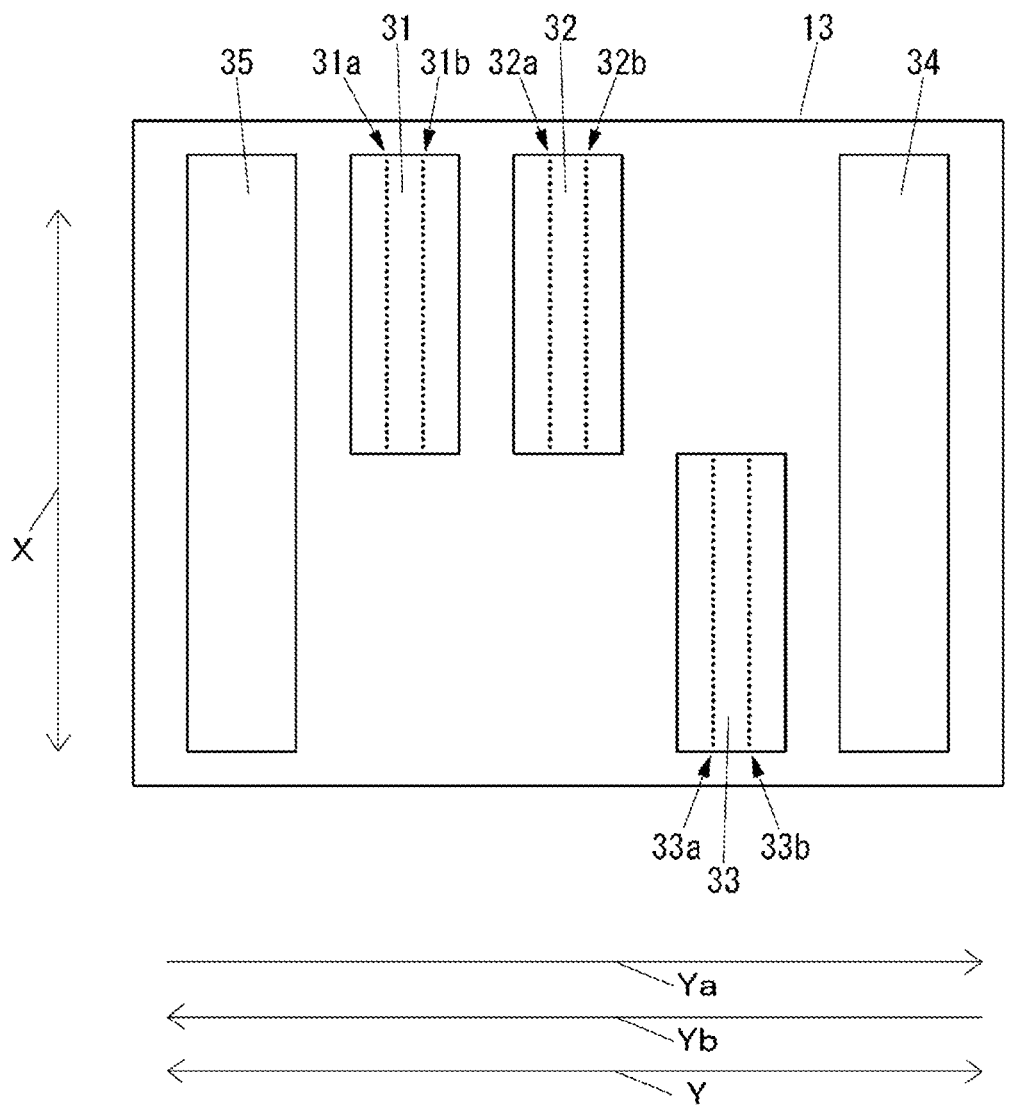
FIG. 3 is a bottom view of a carriage shown in FIG. 1 for showing an example of an inkjet head and a light irradiation device.

FIG. 3 is a bottom view of the carriage 13 for showing an example of the inkjet head 14 and the light irradiation device 15.

In the example shown in FIG. 3, inkjet heads 31, 32, and 33 are mounted on the carriage 13 as the inkjet head 14. Furthermore, light irradiation devices 34 and 35 are mounted on the carriage 13 as the light irradiation device 15.

The inkjet head 31 and the inkjet head 32 have different positions in the main scanning direction, but the same position in the sub scanning direction. Each of the inkjet heads 31 and 32 and the inkjet head 33 are arranged in a staggered manner. That is, the positions of the inkjet heads 31 and 32 and the inkjet head 33 are different from each other in the main scanning direction, and the positions are also different from each other in the sub scanning direction.

The inkjet head 31 includes nozzle rows 31a and 31b in which a large number of nozzles for ejecting ink are aligned in the sub scanning direction. The nozzle rows 31a and 31b are aligned in the main scanning direction. The ink ejected by the nozzle rows 31a and 31b is an ink in which the warp when cured and shrunk by irradiation of light is a forward warp to be described later (hereinafter referred to as "forward warp ink"). As the ink ejected by the nozzle rows 31a and 31b, for example, LH-100 and MH-100 (for 3D printing) manufactured by Mimaki Engineering Co., Ltd. can be adopted.

The inkjet head 32 includes nozzle rows 32a and 32b in which a large number of nozzles for ejecting ink are aligned in the sub scanning direction. The nozzle rows 32a and 32b are aligned in the main scanning direction. The ink ejected by the nozzle rows 32a and 32b is an ink in which the warp when cured and shrunk by irradiation of light is a reverse warp to be described later (hereinafter referred to as "reverse warp ink"). As the ink ejected by the nozzle rows 32a and 32b, for example, LF-140, LUS-120, LUS-150, and LUS-200 manufactured by Mimaki Engineering Co., Ltd. can be adopted.

The inkjet head 33 includes nozzle rows 33a and 33b in which a large number of nozzles for ejecting ink are aligned in the sub scanning direction. The nozzle rows 33a and 33b are aligned in the main scanning direction. The ink ejected by the nozzle rows 33a and 33b is a reverse warp ink. As the ink ejected by the nozzle rows 33a and 33b, for example, LF-140 manufactured by Mimaki Engineering Co., Ltd. can be adopted.

As described above, the inkjet printer 10 uses forward warp ink and reverse warp ink. The inkjet printer 10 may use an ink set including forward warp ink and reverse warp ink.

The light irradiation device 34 is arranged in the outward direction with respect to the inkjet heads 31 to 33, and the light irradiation device 35 is arranged in the return direction with respect to the inkjet heads 31 to 33.

Next, the forward warp and the reverse warp mentioned above will be described.

(a) of FIG. 4 is a front view of a part of the inkjet printer 10 when the ink is forward warped. (b) of FIG. 4 is a front view of a part of the inkjet printer 10 when the ink is reverse warped.

As shown in (a) of FIG. 4, the forward warp is a warp in which a portion on a side where light is irradiated by the light irradiation device 15, that is, the upper portion 80a in the vertical direction, is large in the degree of curing and shrinkage as compared with a portion on the side opposite to the side where light is irradiated by the light irradiation device 15, that is, the lower portion 80b in the vertical direction, in the layer of ink (hereinafter referred to as "ink layer") 80 formed by being ejected by the inkjet head 14.

As shown in (b) of FIG. 4, the reverse warp is a warp in which a portion on a side opposite to the side where light is irradiated by the light irradiation device 15, that is, the lower portion 80b in the vertical direction, is large in the degree of curing and shrinkage as compared with a portion on the side where light is irradiated by the light irradiation device 15, that is, the upper portion 80a in the vertical direction, in the ink layer 80.

Next, the operation of the inkjet printer 10 will be described.

Upon receiving the print data through the communication unit 20, the control unit 22 executes printing on the medium 70 based on the print data received through the communication unit 20. That is, the control unit 22 moves the carriage 13 in the main scanning direction by the carriage scanning device 17 to eject ink toward the medium 70 by the inkjet head 14, and irradiates the ink attached to the medium 70 with light from the light irradiation device 15 to execute printing on the medium 70 in the main scanning direction. Furthermore, when printing on the medium 70 in the main scanning direction is executed, the control unit 22 transports the medium 70 in the sub scanning direction by the medium transporting device 16, as necessary, thereby changing the position of printing with respect to the medium 70 in the sub scanning direction, and thereafter executing printing on the medium 70 in the main scanning direction again.

When ink is ejected by the inkjet head 14 in a case where the carriage 13 is moved in the main scanning direction by the carriage scanning device 17, the ink ejected by the inkjet head 14 and attached to the medium 70 is irradiated with light by the light irradiation device 15 disposed on the upstream side in the moving direction of the carriage 13 with respect to the inkjet head 14. That is, when ink is ejected by the inkjet heads 31 to 33 in a case where the carriage 13 is moved in the outward direction by the carriage scanning device 17, the ink ejected by the inkjet heads 31 to 33 and attached to the medium 70 is irradiated with light by the light irradiation device 35. When the ink is ejected by the inkjet heads 31 to 33 in a case where the carriage 13 is moved in the return direction by the carriage scanning device 17, the ink ejected by the inkjet heads 31 to 33 and attached to the medium 70 is irradiated with light by the light irradiation device 34.

Next, the experimental results by the inkjet printer 10 will be described.

First, the first experiment by the inkjet printer 10 will be described.

FIG. 5 is a side view of a printed matter 90 printed through experiment by the inkjet printer 10.

In the printed matter 90 shown in FIG. 5, ink layers 91 and 92 are formed on the medium 70. That is, in the printed matter 90 shown in FIG. 5, only two ink layers are formed on the medium 70.

In the first experiment by the inkjet printer 10, the ink layer 91 is printed by the inkjet head 33, and the ink layer 92 on the ink layer 91 is printed by both the inkjet head 31 and the inkjet head 32. The inkjet head 31 and the inkjet head 32 form the ink layer 92 by ejecting ink in the same scan in the main scanning direction.

FIG. 6 is a diagram showing the first experimental result by the inkjet printer 10.

In FIG. 6, the numerical value indicates the amount of ink (%). The numerical value indicating the amount of ink is 100% when all the pixels are formed by the dots of ink ejected by one nozzle row in an image printed on the medium 70 by the inkjet printer 10. Therefore, in FIG. 6, for the inkjet head 31, for example, 160% means that, for example, the nozzle rows 31a and 31b each ejected 80% of the ink. For the inkjet head 32, for example, 60% means that, for example, the nozzle rows 32a and 32b each ejected 30% of the ink. For the inkjet head 33, 200% means that the nozzle rows 33a and 33b each ejected 100% of the ink.

In the first experimental result by the inkjet printer 10, the warp was less than or equal to an allowable amount when the ratios of the forward warp ink and the reverse warp ink are 120%:80% and 160%:60% in the ink forming the ink layer 92. That is, in the ink forming the ink layer 92, the warp was less than or equal to the allowable amount when the ratio of the forward warp ink and the reverse warp ink is 120 to 160%:60 to 80%.

Next, a second experiment by the inkjet printer 10 will be described.

The second experiment by the inkjet printer 10 differs from the first experiment by the inkjet printer 10 in that the ink ejected by the nozzle row 33b is a forward warp ink. As the ink ejected by the nozzle row 33b, for example, LH-100 manufactured by Mimaki Engineering Co., Ltd. can be adopted.

In the second experiment by the inkjet printer 10, similarly to the first experiment, the ink layer 91 is printed by the inkjet head 33, and the ink layer 92 on the ink layer 91 is printed by both the inkjet head 31 and the inkjet head 32. The nozzle row 33a and the nozzle row 33b in the inkjet head 33 form the ink layer 91 by ejecting ink in the same scan in the main scanning direction. The inkjet head 31 and the inkjet head 32 form the ink layer 92 by ejecting ink in the same scan in the main scanning direction.

FIG. 7 is a diagram showing the second experimental result by the inkjet printer 10.

In FIG. 7, the numerical value indicates the amount (%) of the ink as in FIG. 6.

In the second experimental result by the inkjet printer 10, the warp was less than or equal to an allowable amount when the ratios of the forward warp ink and the reverse warp ink are 60%:180%, 80%:160%, and 80%:140% in the ink forming the ink layer 92. That is, in the ink forming the ink layer 92, the warp was less than or equal to the allowable amount when the ratio of the forward warp ink and the reverse warp ink is 60 to 80%:140 to 180%.

As described above, the inkjet printing method according to the present embodiment can suppress the warp of the printed matter since the forward warp ink and the reverse warp ink are printed in an arrangement that reduces the warp of each other.

The arrangement in which the forward warp ink and the reverse warp ink reduce the warp of each other may be an arrangement in which the forward warp ink and the reverse warp ink are mixed in the same ink layer, or may be an arrangement in which a plurality of overlapped ink layers include at least an ink layer formed by the forward warp ink and at least an ink layer formed by the reverse warp ink.

Here, an example of an arrangement in which the forward warp ink and the reverse warp ink are mixed in the same ink layer will be described with reference to FIG. 8.

FIG. 8 is a perspective view of a part of the printed matter 100 printed by the inkjet printer 10.

As shown in FIG. 8, printing is performed so that a plurality of ink droplets 101 ejected by the inkjet head 14 and landed on the medium 70 are connected. At this time, the ink droplet 101 includes the forward warp ink droplet 101a and the reverse warp ink droplet 101b. Since printing is performed by mixing the forward warp ink droplets 101a and the reverse warp ink droplets 101b, for example, the warp of the printed matter 100 formed by being printed on the thin medium 70 can be suppressed.

In FIG. 8, the forward warp ink droplet 101a and the reverse warp ink droplet 101b are drawn separately according to the difference in shade. That is, in the ink droplets 101 drawn in FIG. 8, the ink droplets 101 having a high density are the forward warp ink droplets 101a, and the ink droplets 101 having a low density are the reverse warp ink droplets 101b. In FIG. 8, the forward warp ink droplets 101a and the reverse warp ink droplets 101b are drawn alternately, but the pattern of arrangement of the forward warp ink droplets 101a and the reverse warp ink droplets 101b may be a pattern other than the pattern shown in FIG. 8.

In the inkjet printer 10, the arrangement of the inkjet head 14 is the arrangement shown in FIG. 3 in the present embodiment, but the arrangement other than the arrangement shown in FIG. 3 may be adopted.

In the present embodiment, the inkjet printer 10 moves the medium 70 in the sub scanning direction with respect to the inkjet head 14 by transporting the medium 70 in the sub scanning direction with respect to the platen 11. However, the inkjet printer 10 may move the inkjet head 14 in the sub scanning direction with respect to the medium 70 by including a mechanism that extends the platen 11 in the sub scanning direction from that shown in FIG. 1 to obtain a so-called flat bed type inkjet printer, as shown in FIG. 9, for example, and moves the guide rail 12 and the carriage 13 in the sub scanning direction with respect to the platen 11.

In the above description, 2D printing is described. However, the present invention is also applicable to 2.5D printing and 3D printing.

FIG. 10 is a side sectional view of a three-dimensional printed matter 110 printed by an inkjet printer for 3D printing, which is different from the inkjet printer 10.

The printed matter 110 shown in FIG. 10 is printed by stacking the ink layers 110a to form a three-dimensional shaped object by the plurality of ink layers 110a.

The printed matter 110 shown in FIG. 10 includes a three-dimensional object 111 and a support portion 112 that supports the three-dimensional object 111 by surrounding the outer periphery of the three-dimensional object 111 being shaped. The support portion 112 is removed from the outer periphery of the three-dimensional object 111 by some method, for example, by being dissolved and removed with water after the shaping of the three-dimensional object 111 is completed.

The three-dimensional object 111 includes a shaping region 111a that forms the main shape of the three-dimensional object 111, a white region 111b of white color disposed outside the shaping region 111a adjacently to the shaping region 111a, a transparent internal clear region 111c disposed outside the white region 111b adjacently to the white region 111b, a colored region 111d that is disposed outside the internal clear region 111c adjacently to the internal clear region 111c and colored, and a transparent external clear region 111e disposed outside the colored region 111d adjacently to the colored region 111d.

Since the white region 111b reflects light entering from the outside of the three-dimensional object 111 through the external clear region 111e, the colored region 111d, and the internal clear region 111c, the coloring by the colored region 111d can be visually recognized with an appropriate color from the outside of the three-dimensional object 111.

Since the internal clear region 111c is provided between the white region 111b and the colored region 111d, in a case where the printed matter 110 is formed, for example, when the upper end of the ink layer 110a is flattened by a flattening member (not shown), the white ink in the white region 111b and the non-white ink in the colored region 111d can be appropriately prevented from mixing.

The external clear region 111e can protect the surface of the three-dimensional object 111 from physical contact and prevent the colored region 111d from fading due to ultraviolet rays.

At least a part of each of the white region 111b, the internal clear region 111c, the colored region 111d, and the external clear region 111e may be omitted.

The ink layer 110a constituting the shaping region 111a includes an ink layer 110b formed by forward warp ink and an ink layer 110c formed by reverse warp ink. Since printing is performed so that the shaped object includes the ink layer 110b formed by the forward warp ink and the ink layer 110c formed by the reverse warp ink, the warp of the printed matter 110, which is a three-dimensional shaped object, can be suppressed.

In FIG. 10, the ink layer 110b formed by the forward warp ink and the ink layer 110c formed by the reverse warp ink are drawn separately according to the difference in shade. That is, in the ink layers 110a constituting the shaping region 111a drawn in FIG. 10, the ink layer drawn with a high density is the ink layer 110b formed by the forward warp ink, and the ink layer drawn with a low density is the ink layer 110c formed by the reverse warp ink. In FIG. 10, the ink layer 110b formed by the forward warp ink and the ink layer 110c formed by the reverse warp ink are drawn alternately, but the pattern of arrangement of the ink layer 110b formed by the forward warp ink and the ink layer 110c formed by the reverse warp ink may be a pattern other than the pattern shown in FIG. 10.

FIG. 11 is a diagram showing an example of the ink layer 110a constituting the shaping region 111a shown in FIG. 10 different from the example shown in FIG. 10.

The ink layer 110a shown in FIG. 11 is formed by mixing a portion 110d formed by the forward warp ink and a portion 110e formed by the reverse warp ink. Since printing is performed so that the shaped object includes the ink layer 110a formed by mixing the forward warp ink and the reverse warp ink, the warp of the printed matter 110, which is a three-dimensional shaped object, can be suppressed.

In FIG. 11, the portion 110d formed by the forward warp ink and the portion 110e formed by the reverse warp ink are drawn separately according to the difference in shade. That is, in the ink layers 110a drawn in FIG. 11, the ink layer drawn with a high density is the portion 110d formed by the forward warp ink, and the ink layer drawn with a low density is the portion 110e formed by the reverse warp ink. In FIG. 11, the portion 110d formed by the forward warp ink and the portion 110e formed by the reverse warp ink are drawn alternately, but the pattern of arrangement of the portion 110d formed by the forward warp ink and the portion 110e formed by the reverse warp ink may be a pattern other than the pattern shown in FIG. 11.

The invention claimed is:

1. An inkjet printing method that uses an inkjet printer comprising:
   an inkjet head that ejects ink, which cures and shrinks when irradiated with light; and
   a light irradiation device that irradiates light toward the ink, wherein
   a forward warp ink and a reverse warp ink are printed in an arrangement that reduces warp of each other,
   the forward warp ink serving as the ink where a warp when cured and shrunk by irradiation of light is a forward warp in which a portion on a side where the light is irradiated by the light irradiation device is large in the degree of curing and shrinkage as compared with a portion on a side opposite to the side where the light is irradiated by the light irradiation device, and
   the reverse warp ink serving as the ink where a warp when cured and shrunk by irradiation of light is a reverse warp in which a portion on a side opposite to a side where the light is irradiated by the light irradiation device is large in the degree of curing and shrinkage as compared with a portion on the side where the light is irradiated by the light irradiation device;
   when printing is performed by stacking a plurality of ink layers of the ink to form a three-dimensional shaped object, printing is performed so that the three-dimensional shaped object includes a forward warp layer as the ink layer that warps forwardly and a reverse warp layer as the ink layer that warps reversely;
   wherein the forward warp layer and the reverse warp layer are formed by mixing the forward warp ink and the reverse warp ink;
   wherein the ink layer is formed by mixing a portion formed by the forward warp ink and a portion formed by the reverse warp ink within the ink layer.

2. The inkjet printing method as set forth in claim 1, wherein
   when printing is performed so that a plurality of droplets of the ink ejected by the inkjet head and landed on a medium are connected, printing is performed by mixing the droplets of the forward warp ink and the droplets of the reverse warp ink.

3. An ink set used by an inkjet printer including,
   an inkjet head that ejects ink, which cures and shrinks when irradiated with light, and
   a light irradiation device that irradiates light toward the ink, the ink set comprising:
   a forward warp ink serving as the ink where a warp when cured and shrunk by irradiation of light is a forward warp in which a portion on a side where the light is irradiated by the light irradiation device is large in the degree of curing and shrinkage as compared with a portion on a side opposite to the side where the light is irradiated by the light irradiation device; and
   a reverse warp ink serving as the ink where a warp when cured and shrunk by irradiation of light is a reverse warp in which a portion on a side opposite to a side where the light is irradiated by the light irradiation device is large in the degree of curing and shrinkage as compared with a portion on the side where the light is irradiated by the light irradiation device;
   when printing is performed by stacking a plurality of ink layers of the ink to form a three-dimensional shaped object, printing is performed so that the three-dimensional shaped object includes a forward warp layer as the ink layer formed by the forward warp ink and a reverse warp layer as the ink layer formed by the reverse warp ink;
   wherein the forward warp layer and the reverse warp layer are formed by mixing the forward warp ink and the reverse warp ink;
   wherein the ink layer is formed by mixing a portion formed by the forward warp ink and a portion formed by the reverse warp ink within the ink layer.

4. The inkjet printing method as set forth in claim 1, wherein
   in the ink forming the ink layer, a ratio of the forward warp ink and the reverse warp ink is:
   120% to 160%: 60% to 80%, or
   60% to 80%: 140% to 180%.

5. The inkjet printing method as set forth in claim 1, wherein
   the forward warp layer and the reverse warp layer are alternately laminated.

* * * * *